3,150,105
WET OXIDATIVE REACTIVATION OF SPENT ACTIVE CARBON
Willard E. Ledding, Clarendon Hills, Ill., assignor to Corn Products Company, New York, N.Y., a corporation of Delaware
Filed Jan. 12, 1961, Ser. No. 82,344
4 Claims. (Cl. 252—416)

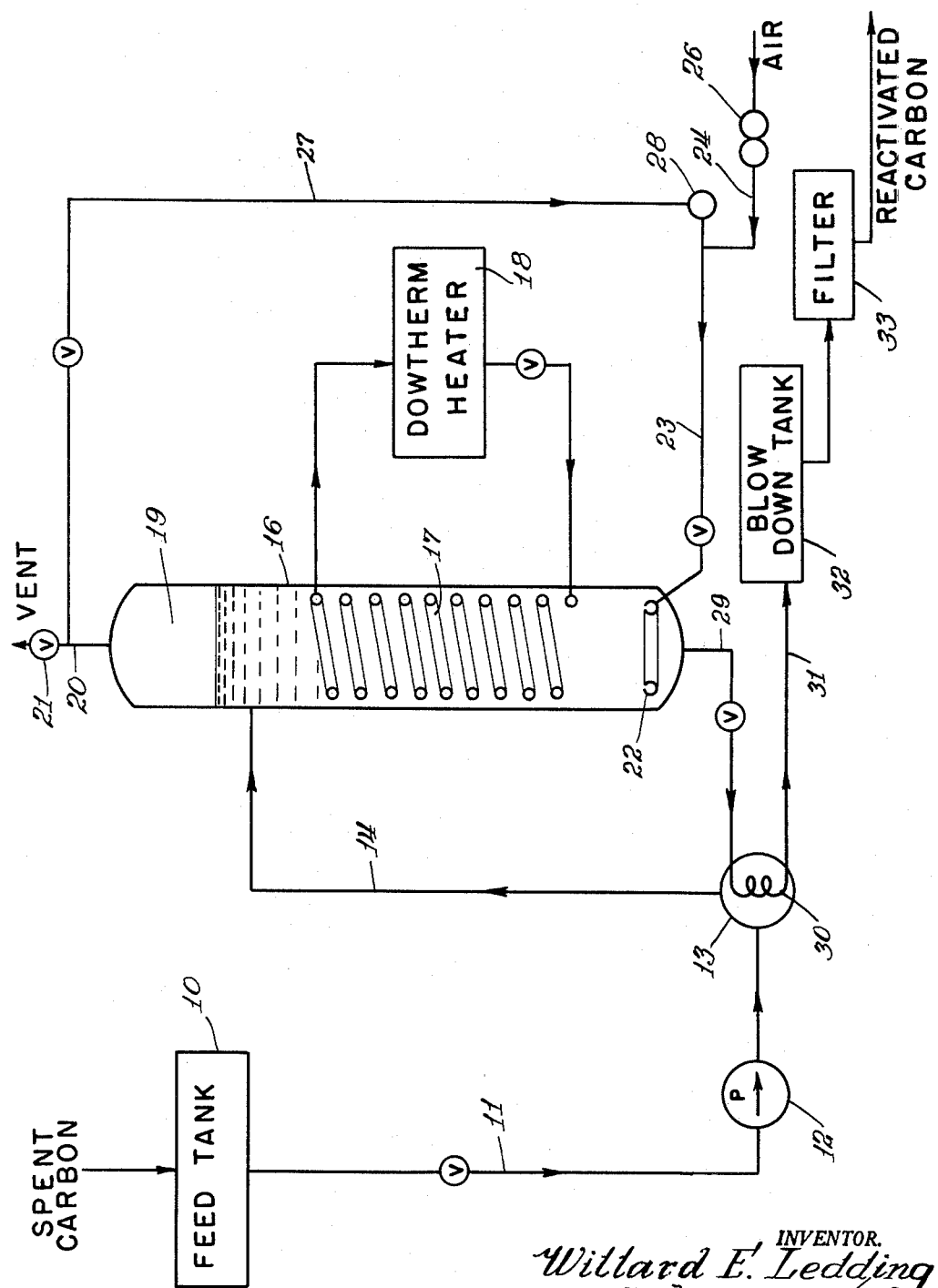

This invention relates to the revivification of spent carbon which has been inactivated, either partially or completely, by the occlusion or accumulation thereon of combustible impurities. The invention is particularly concerned with a method of revivifying such spent carbon in a liquid environment.

Vegetable carbon and other forms of carbon are widely used in the industry for removing undesirable color or odor from liquids, such as raw sugar solutions. In such purification processes the impurities responsible for the objectionable colors or odors are adsorbed or otherwise retained by the carbon, whereby the carbon becomes spent and its activity for this purpose is reduced or totally destroyed. Such impurities are primarily organic in nature and are combustible, and they have heretofore been removed by heating the spent carbon to high temperatures in the presence of air, or other oxygen-containing gas, which resulted in the impurities being burned off the carbon. While such reactivation methods have found some acceptability in the art, they have not been entirely satisfactory since powdered carbon is difficult to handle and transport, and special equipment is required for treating carbon in the dry state. Also, carbon losses in such prior art processes tend to be rather high, since the temperature of the oxidation reaction is frequently high enough to cause the carbon to glow, and only by the most careful control of the concentration of oxygen in the regenerating gas may the oxidation of the carbon be maintained within reasonable limits.

It is an object of the invention to provide a process for revivifying carbon which has become inactivated by the accumulation thereon of organic or other combustible impurities, wherein the carbon is treated in a liquid environment at a temperature below the temperatures commonly used in prior art carbon revivifying processes. By employing a liquid medium for the reaction, undersirable local superheating is avoided through the moderating influence of the medium, and incombustible soluble solids remaining after the oxidation reaction are carried away by the medium in the subsequent filtering operation.

A further object is to provide a process of the kind referred to in the foregoing object, capable of being carried out in conventional high-pressure apparatus which may be easily assembled from readily available components, and requiring less in the way of controls and auxiliary apparatus than the prior art methods of revivifying carbon in the dry state.

Other objects and advantages of the invention will become apparent from the following description thereof:

Broadly speaking, the present process is practiced by maintaining an aqueous slurry of the spent carbon at relatively high temperature and pressure, in contact with an oxygen-containing gas. By the term "oxygen-containing gas" is meant any gas containing free, or molecular, oxygen, such as air, ozone, oxygen, or the like. It is not intended to include gases in which oxygen has been chemically combined with another element or elements, e.g., carbon dioxide. The process may be conducted in a batchwise manner, in which case the aqueous carbon slurry and oxygen-containing gas are confined in an autoclave or other suitable high-pressure equipment throughout the reaction period. The process may also be conducted in a continuous manner, wherein the aqueous spent carbon slurry and oxygen-containing gas are continuously introduced into a reactor maintained at the desired temperature and pressure, and the space velocities of the reactants are regulated so that their residence time in the reactor is sufficient to permit the oxidation to proceed to the desired extent.

The duration of the treatment of the aqueous spent carbon slurry is a function of the temperature, pressure, and concentration of oxygen in the treating gas. Where low temperatures are used, e.g., 370° to 400° F., and oxygen at about 1500 to 1800 p.s.i.g. is used as the oxidizing gas, a treatment of about four hours in the batch process will ordinarily produce a carbon having an activity, as measured by its decolorizing capacity tested on a standard sugar liquor, approximating that of the original carbon or char. Higher temperatures and pressures shorten the reactivation period, all other factors being equal. Substitution of air or other gas containing less than 100 percent oxygen, correspondingly lengthens the reaction period required to produce a finished product of equivalent reactivity.

Whether oxygen alone, or oxygen diluted with some other gas, is used is a matter of choice, and depends on the speed of the reactivation reaction demanded by the requirements of the plant for the reactivated product, on the inventory of carbon desired to be maintained in the plant, on the reactivating capacity of the apparatus desired to be used in the reactivation process, and on other factors. The concentration of carbon in the slurry being treated can, of course, be varied between wide limits, but carbon concentration is preferably high enough, e.g., about 75 grams or more per liter of water, so that the oxygen-containing gas and the apparatus are utilized efficiently. Concentrations of carbon in the slurry which are high enough to interfere appreciably with the free passage of gas therethrough are, of course, undesirable.

In the batch type of operations, the oxygen concentration in the reaction zone is preferably greater than that stoichiometrically required by the oxidizable impurities, in order to prevent the oxidizing atmosphere from becoming too lean in oxygen near the end of the reaction, thereby effecting the oxidation of the impurities within a reasonable time. Under such conditions the oxidation reaction is discontinued before all of the oxygen contained in the gas has reacted, in order to prevent undue oxidation of the carbon base. Similarly, in the continuous operation, the oxygen content of the gas is above that required stoichiometrically for oxidation of the impurities, and the residence time of the carbon in the reactor is controlled to prevent substantial oxidation of the carbon base under the conditions of temperature and pressure prevailing in the reactor. The adjustment of the reaction time in both the batch and the continuous processes is readily made by those skilled in the art having knowledge of the temperature, pressure and oxygen concentration in the reaction zone.

The following examples are illustrative of the batch process of the present invention. Although the carbon treated in the process discussed in these examples was rendered inactive by the occlusion or retention of impurities removed from sugar in a sugar-decolorizing process, such as color bodies and hydroxymethyl furfural, it will be understood that carbons rendered inactive through the retention thereon of other combustible impurities are also susceptible to treatment by the present process.

*Example 1*

One hundred and seventy-five (175) grams of spent activated carbon, rendered inactive by the use in the decolorizing treatment of sugar solutions, was slurried in 2250 ml. of water and charged into a one-gallon high-pressure autoclave equipped with an agitator and electrical resistance heaters. Oxygen from a cylinder was introduced into the autoclave until the pressure reached 300 p.s.i.g., at which time the eelctric heaters were energized and temperature of the autoclave contents thereby brought up to 600° F. The pressure at this point reached 1850 p.s.i.g. The contents of the autoclave were held at this temperature and pressure and agitated for two hours, at which time they were cooled and discharged, the carbon being recovered by filtration. The recovered carbon had a refining efficiency (i.e., a decolorizing capacity tested on a standard sugar liquor) essentially equal to that of virgin carbon. Carbon loss in the process amounted roughly to 5 percent.

Example 2

The procedure set forth in Example 1 was repeated except that air was used instead of oxygen. The reactivated carbon produced by this modification of the process had a refining efficiency of about 68 percent of that of virgin carbon.

Example 3

One hundred and seventy-five grams of spent carbon which had been rendered inactive by use in decolorizing sugar liquors was slurried in 2250 ml. of water, and the slurry was charged into a one-gallon high-pressure autoclave equipped with an agitator and electrical resistance heaters. Oxygen from a cylinder was introduced into the autoclave until the pressure reached 1400 p.s.i.g., at which time the electric heaters were energized and the temperature of the autoclave contents thereby brought up to 600° F. The pressure at this point reached 3000 p.s.i.g. The contents of the autoclave were held at this temperature and pressure and agitated for two hours, after which the slurry was cooled and discharged from the autoclave. The reactivated carbon had a refining efficiency of 164 percent of that of virgin carbon. Carbon loss amounted to approximately 30 percent.

Example 4

The procedure outlined in Example 3 was repeated except the reaction time was reduced to one hour. The resulting reactivated carbon had a refining efficiency of 156 percent of that of virgin carbon, and the carbon loss amounted to about 13 percent.

Example 5

A sample of carbon was carried through four cycles of use for decolorizing hydrol by reactivating the carbon after each use by treatment with oxygen in an autoclave pressurized to 1400 p.s.i.g. oxygen pressure at room temperature and then heated at 600° F. for one hour. The total pressure then reached 3400 p.s.i.g. After the fourth cycle, the carbon still had a refining efficiency at least equal to that of virgin carbon.

Example 6

Five hundred grams of wet spent carbon cake rendered inactive by use in decolorizing corn sugar liquors were slurried with 1000 ml. of water and autoclaved at 370° to 400° F. under an atmosphere of oxygen at 1500 to 1800 p.s.i.g. for abouty four hours. The slurry was then cooled and discharged from the autoclave. The resulting reactivated carbon had a refining efficiency at least equal to that of virgin carbon.

Example 7

Five hundred grams of wet spent granular activated carbon which had been rendered inactive by use in decolorizing corn sugar liquors were slurried with 1000 ml. of water and autoclaved at 370° to 400° F. under an atmosphere of oxygen at 1500 to 1800 p.s.i.g. for about four hours. The slurry was then cooled and discharged from the autoclave. The reactivated char had a refining efficiency in respect of both color and hydroxy methyl furfural removal of about 80 percent of the virgin char.

Example 8

One hundred and seventy-five grams of spent carbon which had ben rendered inactive by use in decolorizing sugar solutions was slurried in 2250 ml. of water, and the slurry autoclaved at 1700 p.s.i.g. oxygen pressure (2200 p.s.i.g. total pressure) for 15 minutes at 500° F., after which the slurry was cooled and discharged from the autoclave. The reactivated carbon had a refining efficiency of 87 percent of that of virgin carbon.

The continuous process is schematically illustrated in the single figure of the accompanying drawing. As shown therein, spent carbon, deactivated by contact with corn syrup in the decolorizing and refining treatment of the latter, is conveyed to a feed tank 10 where it is mixed with water and the resulting slurry continuously agitated to distribute the carbon uniformly throughout the body of water. The slurry is removed from the tank 10 by means of a valved conduit 11 having a pump 12 therein which delivers the slurry at high pressure to a heat exchanger 13, where the slurry is heated by indirect heat exchange with effluent from a reactor now to be described.

The heated slurry is conveyed through a conduit 14 to the upper portion of a high-pressure reactor 16 where it is maintained during a predetermined residence period in heat exchange contact with a heating coil 17 through which is crculated a fluid sold under the designation "Dowtherm" (a eutectic mixture of diphenyl and diphenyl oxide) heated by a conventional heater 18 externally of the reactor. The temperature of the heat exchange fluid and the residence time of the slurry in the reactor are so coordinated that the slurry is maintained at a high temperature, e.g., about 500 to 600° F., and the pressure in the vessel is maintained, in a manner later to be described, at such a value (e.g., about 2000 p.s.i.g.) that most of the water in the reactor is maintained in liquid form. The slurry does not completely fill the reactor, leaving a head space 19 at the top thereof which is connected with a vent conduit 20 having a valve 21 therein for discharging steam and other gases as desired.

Oxygen-containing gas, e.g., oxygen or air, is introduced into the bottom of the reactor 16 through a perforated annular tube 22, or equivalent device, the tube 22 being supplied with oxygen-containing gas by means of a valved conduit 23, and an input conduit 24, the latter being provided with a heavy duty compressor 26. The input side of the compressor 26 communicates with a source of oxygen or other oxygen-containing gas (not shown).

The oxygen leaving the annular tube 22 bubbles through the slurry in the reactor, thereby coming into intimate contact with the spent carbon particles therein and, under the high temperature prevailing in the reactor, effectively oxidizes the oxidizable impurities associated with the carbon. A portion of the oxygen is thereby reacted with the carbon, hydrogen, and nitrogen atoms comprising the impurities, producing gaseous waste products which are in part vented through the line 20 and valve 21.

For most efficient operation of the process it is necessary to add oxygen-containing gas continuously to the reactor, in order to maintain the oxygen concentration high enough to oxidize the impurities at a reasonable rate. Therefore, a considerable portion of the gas in the head space 19 is oxygen, which may be recycled to the reactor after enriching it with fresh oxygen-containing gas. This likewise keeps the carbon suspended and eliminates the need for a mechanical agitator. Accordingly, some of the gas from the reactor 16 is recycled through a valved conduit 27 and a compressor 28, the latter bringing the pressure of the recycled gas up to that of the fresh oxygen-containing gas introduced through the conduit 24, and the fresh gas and recycled gas being combined in the conduit 23 leading to the perforated annular tube 22.

Treated slurry containing reactivated carbon is continuously withdrawn from the bottom of reactor 16 at a rate coordinated with the rate of introduction of spent carbon slurry into the reactor through the conduit 14, these rates being controlled to assure a sufficient residence time of the slurry in the reactor to effect substantially complete oxidation of the oxidizable impurities on the spent carbon, as will appear in greater detail hereinafter.

The slurry of reactivated carbon withdrawn from the reactor through the conduit 29 is passed through coils 30 of heat-exchanger 13, where the treated slurry gives up most of its heat to the cold slurry being conveyed to the reactor, as previously described. After leaving the heat-exchanger, the slurry of reactivated carbon is conveyed by a conduit 31 to a blowdown tank or other suitable decompression vessel 32 where the pressure is reduced to normal atmospheric pressure. From the blowdown tank 32 the slurry of reactivated carbon is conveyed to a filter 33 which separates the reactivated carbon from the water.

In order that the continuous process may be fully understood by those skilled in the art, a particular application thereof will now be given illustrating the reactivation of a given quantity of spent carbon under a specified set of conditions, reference again being made to the drawing.

Spent carbon, rendered inactive during decolorizing and refining operations on corn sugar, is mixed with water in the tank 10, the resulting slurry containing about one pound of carbon per gallon. The slurry is conveyed at about 100° F., under pressure of about 2000 p.s.i.g. to the heat-exchanger 13 where the temperature of the slurry is raised to about 400° F., and the resulting heated slurry is conveyed to the reactor 16 where its temperature is raised to about 500° F. by contact with the heat-exchanger coils 17.

The reactor may be about 12″ in diameter and 30 ft. high, and the effluent from the bottom of the reactor through the conduit 29 is controlled so that the nominal residence time of any given carbon particle therein is about 30 minutes. During such time, the spent carbon is in contact with oxygen-containing gas introduced continuously into the reactor through the conduit 23 and the annular perforated tube 22 at the rate of about 20 cubic feet per minute at 2000 p.s.i.g. The oxygen-containing gas is made up in part of air compressed from atmospheric pressure to about 2000 p.s.i.g. at a rate of 140 cubic feet per minute (measured at atmospheric pressure), the remainder being recycled gas from the head space 19 of the reactor.

The level of the slurry in the reactor is preferably maintained constant and, accordingly, the sum of the effluent of heated slurry from the bottom of the reactor and the steam discharged through the vent valve 21 substantially equals the input of untreated carbon slurry into the reactor. The volume of water leaving the reactor as steam through the vent valve 21 is very small in proportion to the volume of the treated slurry leaving the reactor through the conduit 29, and, consequently, the treated slurry effluent can, by heat exchange in the exchanger 13, preheat the untreated carbon slurry to a temperature very near the operating temperature of the reactor.

The cooled slurry of reactivated carbon leaving the heat-exchanger 13 is further cooled and brought to atmospheric pressure in the blowdown tank 32, and then filtered. Carbon loss in the foregoing procedure is about 5 to 10 percent, and the reactivated carbon has a refining efficiency (measured in terms of decolorizing capacity tested on a standard sugar liquor) at least equivalent to that of virgin carbon.

It is to be understood that the foregoing description of the invention is illustrative, and that various modifications, substitutions, additions and omissions may be made without departing from the spirit or principles of the invention.

I claim:

1. A process of reactivating spent carbon containing oxidizable impurities, which comprises contacting an aqueous slurry of said spent carbon with a gas containing molecular oxygen at superatmospheric pressure and at a temperature of at least 300° F., and discontinuing said treatment before said carbon is substantially oxidized.

2. A process of reactivating spent carbon containing oxidizable impurities, which comprises contacting an aqueous slurry of said carbon with a gas containing molecular oxygen in excess of the amount needed to completely oxidize said impurities, at a temperature of about 600° F. and a pressure of between about 1400 and 3000 p.s.i.g., until said impurities are substantially oxidized, and then reducing said temperature and pressure to about ordinary room temperature before substantial oxidation of said carbon occurs.

3. A process for reactivating spent carbon containing oxidizable impurities which comprises continuously feeding a gas containing molecular oxygen and an aqueous slurry of said spent carbon to a reaction zone at a pressure between about 1400 and 3000 p.s.i.g., maintaining said slurry in said reaction zone at about 600° F. by contact with a heat-exchanger heated from an external source, maintaining said slurry in said zone until said impurities are substantially completely oxidized, and removing said slurry from said zone before substantial oxidation of said carbon occurs.

4. A process of reactivating spent carbon rendered inactive by accumulation thereon of combustible impurities removed from unrefined sugar in a purification operation, comprising preparing an aqueous slurry of said spent carbon, contacting said slurry with a gas containing molecular oxygen at superatmospheric pressure and at a temperature between about 370° and about 600° F. until said impurities are oxidized, and discontinuing said treatment before substantial oxidation of said carbon occurs.

References Cited in the file of this patent

UNITED STATES PATENTS

| | | |
|---|---|---|
| 1,507,521 | Russell | Sept. 2, 1924 |
| 1,771,719 | Meyer | July 29, 1930 |